(12) United States Patent
Haardt

(10) Patent No.: US 7,701,894 B2
(45) Date of Patent: Apr. 20, 2010

(54) SWITCHING SYSTEM, A TRANSMISSION DEVICE, A TRANSMISSION METHOD, AND A SWITCHING METHOD FOR SATELLITES

(75) Inventor: Céline Haardt, Bouloc (FR)

(73) Assignee: Thales, Neuilly sur Seine (FR)

( * ) Notice: Subject to any disclaimer, the term of this patent is extended or adjusted under 35 U.S.C. 154(b) by 1190 days.

(21) Appl. No.: 10/375,142

(22) Filed: Feb. 28, 2003

(65) Prior Publication Data

US 2003/0169699 A1 Sep. 11, 2003

(30) Foreign Application Priority Data

Mar. 5, 2002 (FR) ................................ 02 02770

(51) Int. Cl.
*H04B 7/185* (2006.01)
*H04B 7/212* (2006.01)
*H04W 40/00* (2009.01)

(52) U.S. Cl. .................. 370/323; 370/325; 455/428; 455/430

(58) Field of Classification Search ........................ None
See application file for complete search history.

(56) References Cited

U.S. PATENT DOCUMENTS

| | | | |
|---|---|---|---|
| 5,600,629 A * | 2/1997 | Van Daele et al. .......... 376/349 |
| 5,640,386 A * | 6/1997 | Wiedeman ................... 370/320 |
| 5,790,939 A * | 8/1998 | Malcolm et al. ............ 455/13.2 |
| 5,898,680 A * | 4/1999 | Johnstone et al. ........... 370/316 |
| 5,951,709 A * | 9/1999 | Tanaka ....................... 714/755 |
| 5,959,999 A * | 9/1999 | An .............................. 370/442 |
| 6,108,319 A | 8/2000 | Campanella |
| 6,366,761 B1 * | 4/2002 | Montpetit ................... 455/12.1 |
| 6,400,925 B1 * | 6/2002 | Tirabassi et al. ............ 455/12.1 |
| 6,426,959 B1 * | 7/2002 | Jacobson et al. ............ 370/468 |
| 6,470,004 B1 * | 10/2002 | Murata ........................ 370/347 |
| 6,904,265 B1 * | 6/2005 | Valdivia et al. ............. 455/12.1 |
| 7,031,653 B1 * | 4/2006 | Turley et al. ............... 455/3.02 |

FOREIGN PATENT DOCUMENTS

EP 1037493 A2 9/2000
WO WO 0172073 A1 9/2001

\* cited by examiner

*Primary Examiner*—Gregory B Sefcheck
(74) *Attorney, Agent, or Firm*—Sughrue Mion, PLLC

(57) ABSTRACT

A data switching system for a satellite in a satellite data transmission system which relays from a terrestrial sending area to a terrestrial receiving area via the satellite data including payload data and associated control data which constitutes respective switching requests and provides data on the switching of the payload data. The system analyzes data on the basis of a signal conveying the control data and switches the payload data as a function of the result of the analysis of the associated control data to at least one of a plurality of sending ports for sending it to the receiving area. Only the control data is analyzed. The payload data is not analyzed.

25 Claims, 5 Drawing Sheets

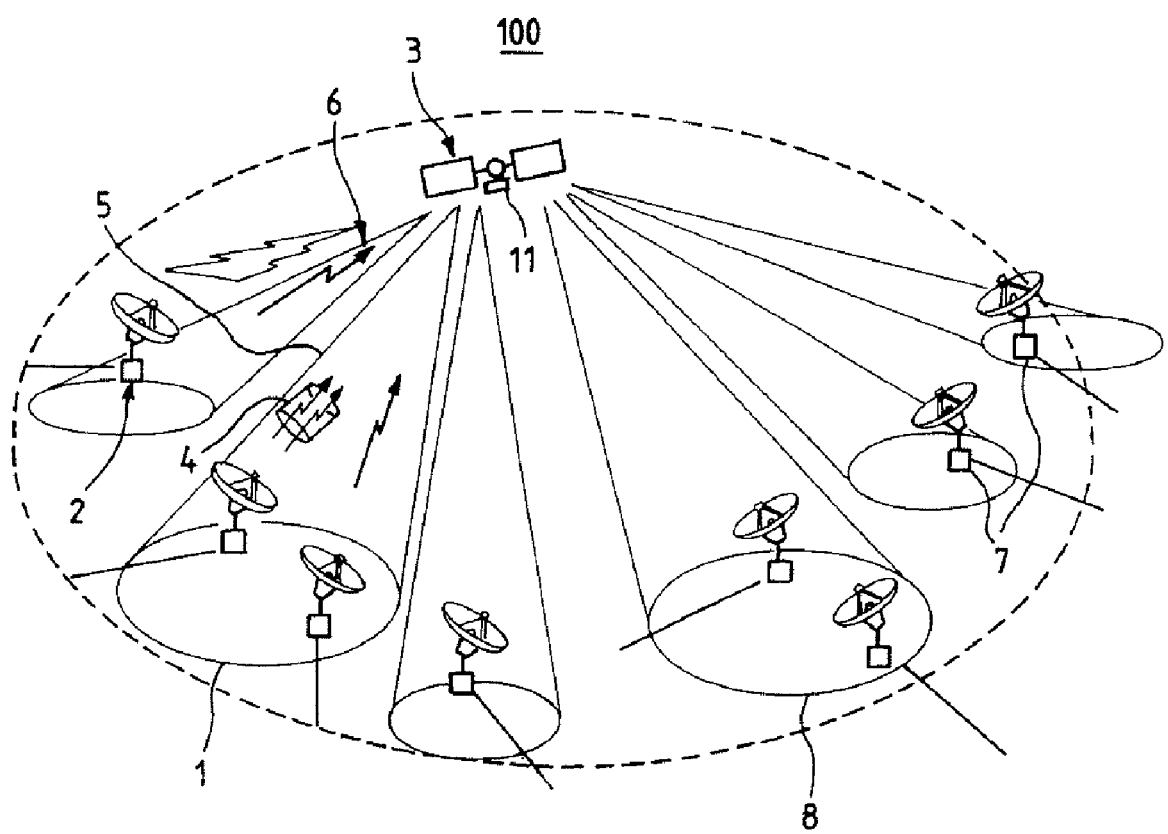
FIG_1

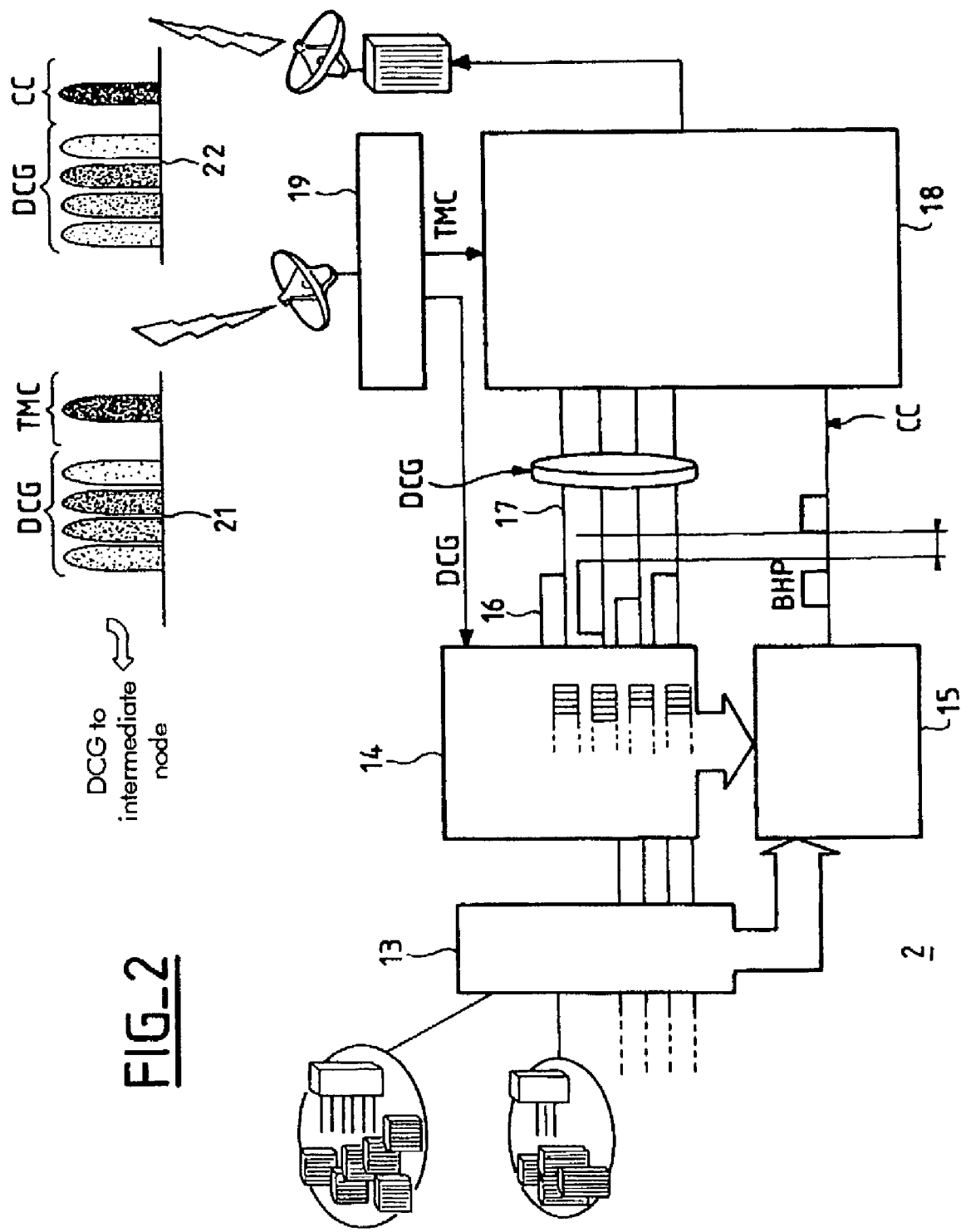
FIG_2

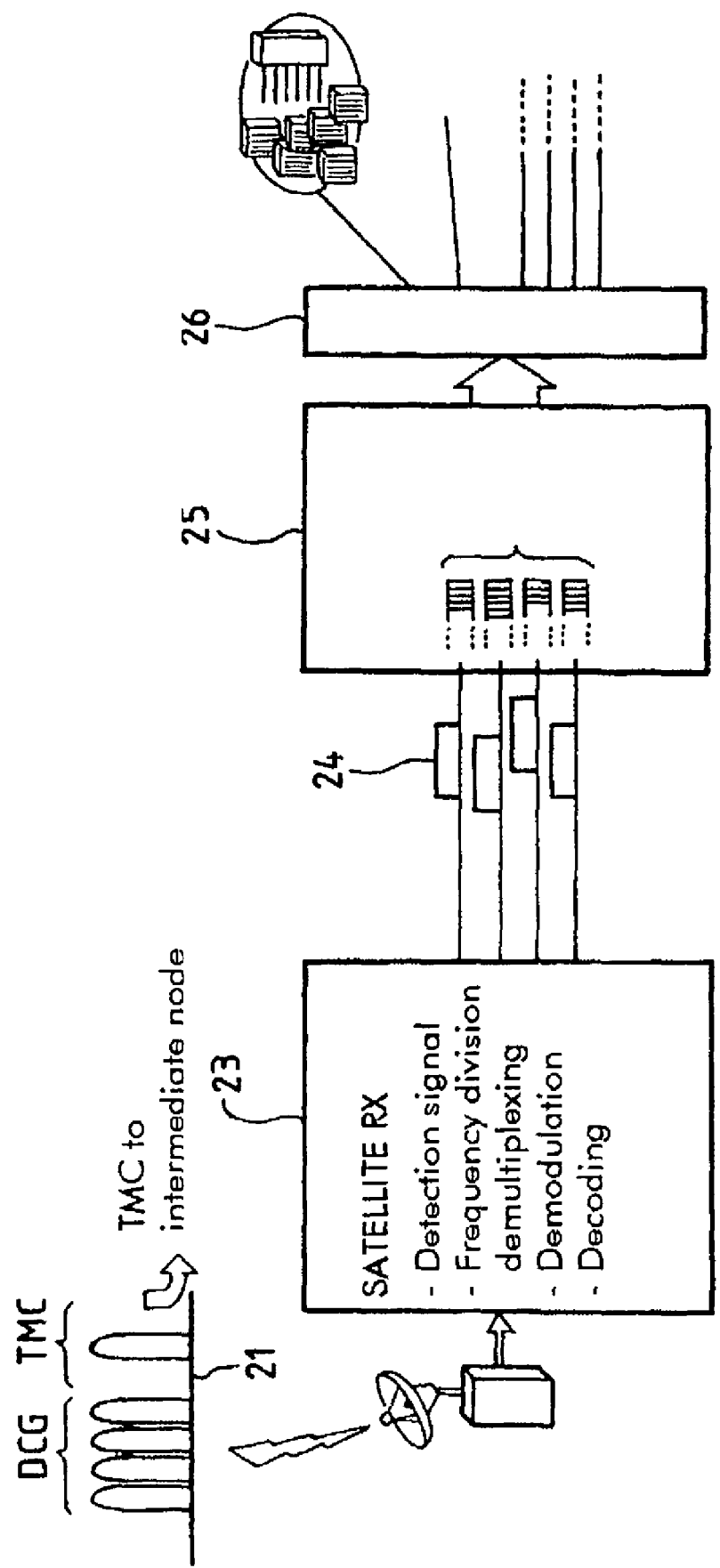

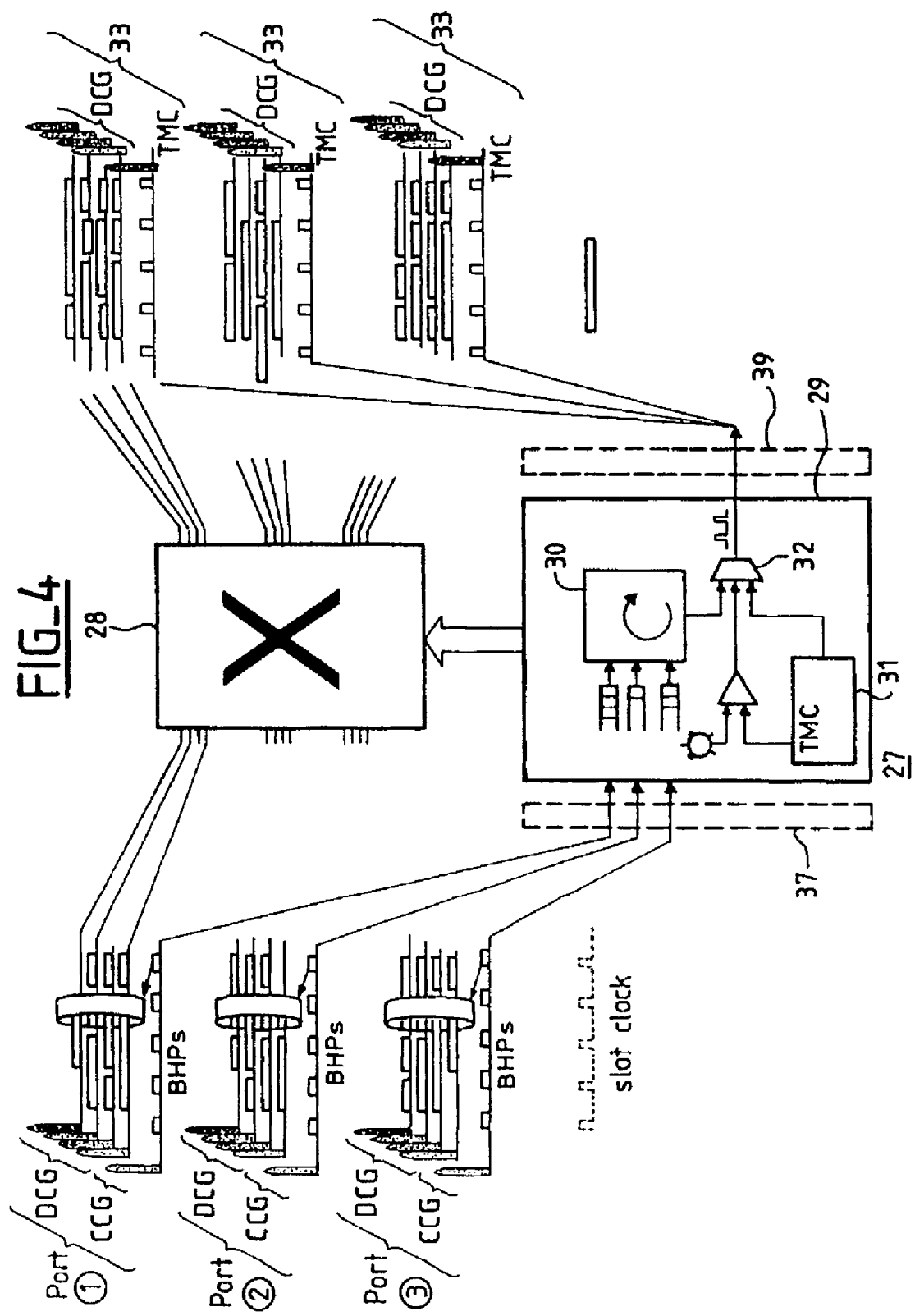
FIG_4

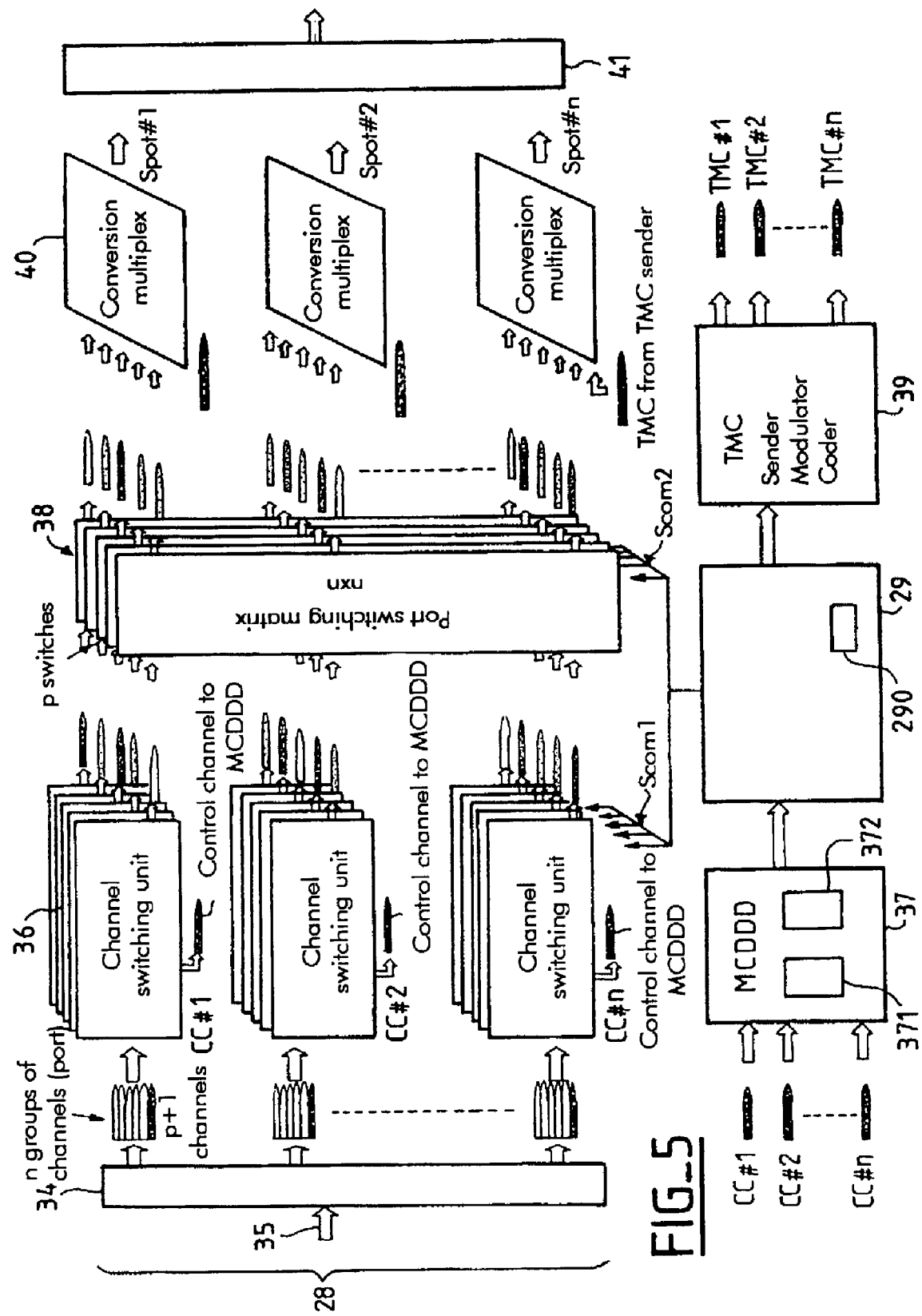
FIG_5

SWITCHING SYSTEM, A TRANSMISSION DEVICE, A TRANSMISSION METHOD, AND A SWITCHING METHOD FOR SATELLITES

CROSS-REFERENCE TO RELATED APPLICATIONS

This application is based on French Patent Application No. 02 02 770 filed Mar. 5, 2002, the disclosure of which is hereby incorporated by reference thereto in its entirety, and the priority of which is hereby claimed under 35 U.S.C. §119.

BACKGROUND OF THE INVENTION

1. Field of the Invention

The present invention relates to a data switching system for a satellite telecommunication system including a plurality of user terminals sending data to a plurality of coverage areas. The data can be transmitted in the form of packets and switched by the switching system on board a satellite. The satellite can be a geostationary or non-geostationary satellite. The packets can be asynchronous transfer mode (ATM) cells, but the device can be adapted for any type of fixed length or variable length packet.

The invention also relates to a transmission device, a transmission method, and a switching method.

2. Description of the Prior Art

A telecommunication system 100 shown in FIG. 1 includes a plurality of user terminals 2, 7 that take the form of ground stations communicating with each other via a satellite 3 with a switch 11 on board. The role of the satellite 3 is to provide very long links 6 where the investment in cable would be unrealistic for financial or technical reasons. The onboard switch 11 therefore receives at its input ports uplinked data or data, i.e. data uplinked from the various ground stations 2 to the satellite 3, and distributes from its output ports downlinked data, i.e. data downlinked from the satellite 3 to other ground stations 7. The terminals 2 that send to the same input port of the switch 11 are grouped in the same geographical coverage area 1, also referred to as a spot or beam. Similarly, the terminals 7 that receive data from the same output port of the switch 11 are grouped in a coverage area 8. The coverage areas are not necessarily separate: it is possible for a terminal 7 to be in several coverage areas at the same time, for example. In particular, the coverage area can transport a stream of data whose final destination is common to a plurality of terminals. The switch 11 advantageously switches the data stream to the output port connected to the common coverage area instead of duplicating said data stream to the various coverage areas, thereby economizing on downlink resources. This facility can be used for multicast data streams, for example, or for collective control data.

The user terminals 2 are very often in competition for resources, i.e. for the uplink and downlink bandwidth of the satellite 3.

Many devices known in the art offer a solution to the problem of dynamic management of the uplink and downlink resources of a satellite system providing dynamic connectivity between coverage areas via the satellite.

One solution to uplink resource management is to use a demand assignment multiple access (DAMA) controller based on a dynamic resource allocation protocol which assigns user terminals frequencies and time slots when said terminals express the requirement to send data in the form of packets on uplinks from a terminal to a satellite by sending requests to that effect to the DAMA controller. A switch on board the satellite then distributes data packets arriving on a plurality of uplinks to a plurality of downlinks.

In the case of downlink resource management, a distinction is drawn between two categories of satellite systems providing dynamic connectivity between coverage areas via the satellite. A first solution consists of making the uplink access patterns and the downlink access patterns completely compatible for a given period during which the switch effects deterministic and a priori switching of the data streams at each of its outputs. There is no situation of conflict for access to the downlink resources since the controller defines the patterns to achieve this. The calculation of the compatibility of the uplink and downlink access patterns results from a synthesis of all the requests from user terminals with the available resources. This calculation is effected by a controller, which can be an onboard controller, although this is not essential, for a defined period during which the patterns are fixed. Any modification of the characteristics of the uplink data stream from a user terminal (for example the bit rate or the destination) generates a new request from said terminal to the switching controller. The controller then proposes new access patterns to the uplinks and the downlinks, compatible with the new configuration. As a result of this, the user terminals are highly interdependent. One consequence is to impede the agility with which the satellite system can respond to a modification of the characteristics of the data stream. This solution uses "deterministic" switching: the position of the packet of the data in an uplink frame pattern determines its destination, so that no address analysis is necessary on board the satellite. This reduces the complexity on the satellite's onboard systems, and the switching unit can be a circuit switch, possibly on the ground.

To address the problems of the interdependence of the terminals and degraded switching agility, justified by increasingly volatile traffic characteristics (unpredictable arrival of data in bursts, short data streams with diversification of destinations), a second solution consists of decoupling the uplink access patterns from the downlink access patterns. The data is grouped into packets which are provided with a header containing an address correlated with a target user terminal. Thanks to this header, the packets are self-switched in the satellite switch. A controller manages access to the uplinks and, after analyzing the address, the switch switches the data on board the satellite and applies statistical multiplexing at each of its outputs. However, statistical management of access to the downlinks leads to the following problem: conflict results if many packets are addressed to the same output at the same time (i.e. must be supported by the same downlink from the satellite to one or more user stations). The conflict is resolved by means of a buffer memory associated with scheduling algorithms. The buffer memory has a finite capacity and if that capacity is exceeded a phenomenon known as congestion results. A first solution to this problem is to increase the size of the buffer memory, representing a penalty in terms of the onboard weight and power consumption balance. A second solution is to include a device for controlling access to the downlinks. The objective of these control mechanisms is to limit the bit rate characteristics of the user terminals whose streams are in competition on a given downlink, either preventively or reactively. This solution is distinguished from the deterministic switching referred to above in the sense that the downlink access pattern is not strictly defined, and the arrangement of the packets remains statistical, although the probability of congestion is reduced by the action of said mechanisms.

From the point of view of onboard complexity, the introduction of the buffer memory and the step of analyzing the destination address have a decisive consequence for onboard implementation. In particular, the use of regenerative processing, which consists of demodulating, decoding (correcting transmission errors), and analyzing the data and then coding and modulating the data using digital technology, is indispensable. These technologies are relatively new, however, and often considered risky. Moreover, the processing capacity of digital equipment leads to a multiplication of the number of equipment units, at the expense of onboard mass and power consumption.

The systems described above are confronted with new demands related to the evolution of the Internet. The increase in the number of autonomous systems, their geographical distribution and the nature of future applications (high bit rates, multiple quality/priority levels, non-connected mode) induce the following constraints:

a requirement for interoperability between networks (reducing adaptation mechanisms),
a high transmission capacity,
hierarchical management of streams in non-connected mode, and
increasingly complex management of addresses (and routes).

Deterministic switching solutions offer high transmission capacity with relative interoperability because the transmission links are transparent (independent of the waveform). However, management of the streams is somewhat inflexible. Statistical switching solutions offer more flexible management of the streams and addresses, but their processing capacity is low and their waveform dependence represents a penalty in terms of interoperability.

The present invention aims to provide a solution in this direction.

To meet the above requirements, the payload of the satellite must be able to:

switch data at high bit rates (hundreds of megabits per second) from different beams (several tens of beams),
establish and manage dynamically and hierarchically the routes for the packets in transit with no concept of connection (by default, managing the addresses for the switches), and
offer the possibility of managing the protocols of the network layer (i.e. of the Internet) to ensure good integration into the terrestrial networks and relative autonomy (this is known as "seamless" integration).

SUMMARY OF THE INVENTION

To this end, the invention provides a data switching system for a satellite in a satellite data transmission system adapted to relay from a terrestrial sending area to a terrestrial receiving area via the satellite data including payload data and associated control data which comprises respective switching requests and is adapted to provide data on the switching of the payload data, which system includes means for analyzing data on the basis of a signal conveying the control data and means for switching the payload data as a function of the result of the analysis of the associated control data to at least one of a plurality of sending ports for sending it to the receiving area, wherein the data analyzer means are adapted to analyze only the control data and the payload data is not analyzed.

Thus prior to the analysis (demodulation, decoding), the system according to the invention adjusts the processing capacity to suit the only category of data to be analyzed, namely switching requests (fields containing the addresses of the packets and packets necessary for signaling, for example).

Thanks to the invention, the great majority of the data switched (payload data) transits in a "passive" manner, not meriting regenerative processing. Because of a pointing mechanism described in this application, the packet header data continues to be correlated with the payload data.

In one embodiment the analyzer means include extractor means for extracting data necessary for analyzing control data carried by the signal followed by control means adapted to configure the switching means as a function of extracted switching data.

In one embodiment the extractor means include means for demodulating and decoding control data.

In one embodiment the signal carrying the data is an FDMA frequency division multiplex signal, first frequency channels are assigned to payload data, second frequency channels are assigned to control data, and the extractor means include frequency division demultiplexer means followed by filter means adapted to supply the data content of the second frequency channels to the control means.

In one embodiment the signal carrying the data is a TDMA time division multiplex signal, first groups of time windows are reserved for the payload data, second groups of time windows are dedicated to the control data, and the extractor means include time division demultiplexer means adapted to supply the data content of the second groups to the control means.

One embodiment of the switching system includes means for generating and transmitting a reference clock for timing the sending of control data packets on board the satellite and payload and control data packets on the ground.

One embodiment of the switching system includes estimator means for estimating the quality of synchronization, referred to as control data packet centering, whereby centering data can thereafter be transmitted to a ground station for centering payload and control data packets to be sent by the station, and/or the characteristics of control data demodulation and decoding on board the satellite, and/or the downlink loads, and/or the status of the equipment on board the satellite.

One embodiment of the switching system includes delay means for delaying any payload data packet in transit in the switching section of the satellite with time delays that are controlled and activated by the analyzer means.

The invention also provides a data transmission device for ground stations of a satellite data transmission system adapted to relay from sending ground stations to receiving ground stations via the satellite data including payload data and associated control data constituting respective switching requests and adapted to provide data on the payload data, which device includes adapter means for transporting the data addressed to the satellite and in which device the control data is analyzed separately from the payload data packets on board the satellite.

One embodiment of the switching system includes means for generating payload data bursts, means for generating control data constituting switching requests each pointing to associated payload data, and means for frequency and/or time division multiplexing the data to assign first channels to payload data and second channels to control data.

In one embodiment the first and second frequency channels are respectively combined in the same first group and the same second group.

The invention further provides a method of transmitting data in a satellite data transmission system adapted to relay from a terrestrial sending area to a terrestrial receiving area via the satellite data including payload data and control data constituting respective switching requests and adapted to provide data on the switching of the payload data to be carried out on board the satellite, the method transmitting payload data on first channels and control data on second channels.

In one embodiment the control data is sent in advance of the associated payload data, the advance time being reduced by the maximum time for analyzing and calculating on board the satellite a switching configuration resulting from all the switching requests.

In one embodiment the payload data and the control data are sent simultaneously.

In one embodiment the payload data is sent in the form of packets separated by periods of silence constituting guard times characteristic of the capacity of the satellite to switch from one switching configuration to another.

In one embodiment data incoming from or outgoing to the exterior of the satellite system undergoes conversion of the transport format to ensure compatibility with the data transport format specific to the satellite system.

In one embodiment the switching requests generated assure propagation of the quality of service concept through the satellite system if the quality of service concept exists outside the satellite system.

In one embodiment the switching requests generated assure correct switching of payload data so that, from a point of view external to the satellite system, the payload data is switched to destinations defined by address data contained in the routing request and associated with the payload data before entering the satellite system, thereby establishing a correspondence between output ports of the satellite and address data associated with the payload data before entering the satellite system.

In one embodiment the sending of payload and control data is clocked by signals from a reference clock on board the satellite and carried by a downlink control channel.

In one embodiment characteristics of the payload data stream in terms of payload bit rate are controlled using an uplink and downlink resource management indicator carried on a downlink control channel.

In one embodiment the sending characteristics of the modulated signal in terms of bit timing, phase, and power are controlled using a demodulation and decoding indicator conveyed by a downlink control channel.

In one embodiment the centering of payload data packets is controlled by separating the payload data packets by a guard time common to all of the satellite system, the guard times being presented to the satellite at the same time in order to change the switching configuration without interruption of service, synchronization using centering data from a downlink control channel.

The invention further provides a method of switching data for a satellite in a satellite data transmission system adapted to relay from a terrestrial sending area to a terrestrial receiving area via the satellite data including payload data and associated control data constituting respective switching requests and adapted to provide data on the switching to be applied to the payload data, the method analyzing only the control data, and not the payload data, and switching the payload data to different sending ports to the receiving area as a function of the analyzed switching requests.

In one embodiment conflict situations that can arise at the same output port are resolved using time reassignment, frequency reassignment or port reassignment.

In one embodiment, in the event of reassignment, a routing request associated with a redirected payload data packet contains a high priority recommendation.

The invention will be better understood and other features will become apparent in the light of the following description and the accompanying drawings.

BRIEF DESCRIPTION OF THE DRAWINGS

FIG. 1, already described, shows a system for transmitting data between two coverage areas via satellite.

FIG. 2 is a block diagram of a first embodiment of an edge node on the ground and also shows the spectrum of the signals received and sent by the node.

FIG. 3 shows one embodiment of a receiver station.

FIG. 4 shows one embodiment of a switching system according to the invention.

FIG. 5 shows some components of the FIG. 4 switching system in more detail.

DETAILED DESCRIPTION OF THE PREFERRED EMBODIMENT

In this application, components having identical or similar functions are identified by the same reference number in the various figures.

FIG. 2 is a block diagram of a first embodiment of an edge node on the ground.

An edge node is an access point of the network for collecting and/or broadcasting data from and/or to a subscriber access node and broadcasting and/or collecting data to and/or from one or more core nodes centralizing the data. In FIG. 1, for example, the terminals 2 and 7 are edge nodes and the satellite 3 is a core node, the user access points, which are aligned with the continuous lines connected to the terminals 2, 7, not being shown. Hereinafter, given their position in the system, the edge nodes are called intermediate nodes. It will emerge hereinafter that there is a master-slave relationship between the satellite and the stations; among other things, the satellite supplies the packet synchronization clock to the stations 2, 7.

As mentioned above, each port represents all of the stream of data transmitted by an edge node, here a terminal 2 referred to hereinafter as a ground station.

According to the invention, each port comprises a set of carriers, assembled to form:
 a data channel group (DCG) made up of data channels, and
 a control channel group (CCG) made up of control channels.

These ports are emulated by appropriate means in the ground stations 2 (edge access point), whose role is to process the data received in order to format the incoming traffic. To this end, the processing operations include:
 reception of IP packets by a network adapter 13,
 assembly into bursts and then division into packets (see below) of payload data having common characters or attributes (same output port, same quality of service (QoS), etc.), this operation being carried out in a generator 14 of bursts 16,
 generation and transmission of switching requests (including the location in time and space of the arrival of the burst on board, the length, the destination address of the associated payload data burst, priority data, etc.); the switching request is sent in advance of the associated data burst on a channel of the control channel group, this operation being carried out in a control packet generator 15,
 where applicable, transmission of dedicated control data (signaling, maintenance protocol, for example) on a channel of the control channel group, and after a particular period, sending payload data bursts on an available channel 17 from the data channel group.

The header of a data burst is transmitted first on the control channel (CC) and is followed, after the predetermined period, by the associated data burst on a parallel data channel (DC). For correct transmission of the data burst, the data header must contain all the data necessary for the controller on board the satellite to switch it.

Each packet header is transmitted as a fixed length burst header packet (BHP). The BHP must be transmitted before the corresponding burst with an offset of predetermined duration $\tau$. This time interval allows resolution of the switching request in the controller. The parameters that influence the offset are explained hereinafter.

The control and data channels are connected to a satellite adapter 18 whose main functions are packet synchronization, known as packet centering, modulation, coding and frequency division multiplexing.

To simplify scheduling on board the satellite, the data bursts are transmitted on a slot-synchronized path. The bursts are divided into fixed size packets known as slots and are separated by time periods known as guard times. The packet synchronization (centering) data in the associated time interval is contained in a channel referred to hereinafter as the telemetric channel (TMC), transmitted by the satellite, as described below, and received in the station 2 by a receiver 19.

The centering data means that the satellite transmission system can be entirely synchronous, the payload data packets on the uplinks all starting at the same time. A period of silence between the payload data packet allows the satellite to progress from one switching plan to another. This period of silence, referred to as the guard time, is respected by all of the stations sending to the satellite. All the uplinks feature this period of silence at the same time.

The satellite can change the switch from one switching configuration to another for a time period compatible with the guard time between payload data packets.

For reasons connected with switching implementation and performance, the size of the payload data packets is fixed and common to all the stations. However, payload data packets of varying size can be envisaged, with the switching request for each payload data packet informing the switching controller of the transit time of the associated payload data packet on board the satellite.

The TMC can also convey other data useful for efficient operation of the system: thus the TMC can carry an indicator of the estimated characteristics of the demodulation and decoding of the control data on board the satellite, an indicator of the downlink loads estimated by the switching control unit, or an estimation indicator defining the status of units on board the satellite. Following an estimation, the above indicators are generated by an estimator 290 described hereinafter with reference to FIG. 5.

The upper part of FIG. 2 shows the spectrum 21 of the signal received by the station 2, including the data channel group (DCG), the TMC, and the spectrum 22 of the sent signal corresponding to the multiplexed signal of the data channel group (DCG) with the CC.

FIG. 3 shows one embodiment of a receiver station 20. The signal sent by the satellite is received by the receiver station, in which a satellite receiver unit 23 carries out the operations of signal detection, in particular by means of the TMC signal, frequency division demultiplexing, demodulation and decoding. These operations are known in the art, and are not described in detail in this application. Following these operations, the packets are recombined into bursts 24 which are transmitted to an IP network packet generator 25. The bursts 24 enable the restoration of IP packets, using means known in the art, for example an indicator contained in each burst identifying the IP destination packet or packets contained in the burst, or a network controller, not shown, allocating each burst its destination by appropriate means. A network adapter 26 configures the resulting packets in accordance with the network protocols.

FIG. 4 shows one embodiment of a switching system 27 conforming to the invention integrated into the satellite.

Ports {port1, port2, port3} representing, as mentioned above, all of the data streams transmitted by respective edge nodes 2, are received at corresponding inputs of the satellite. Each port includes a data channel group (DCG) and a control channel group (CCG).

The payload data channels of each port are received by respective inputs of the switch 28 and the control data channels (including the BHP) of the same ports are directed to corresponding inputs of the controller 29.

After demodulation and decoding, the BHP are then analyzed by a scheduling unit 30 for assigning the payload data bursts to which the BHP point to output ports of the satellite, as a function of parameters indicated in the BHP, such as the duration and the destination of the payload data bursts, their QoS, their priority, etc.

The unit 30 then controls the switching of the payload data bursts in transit "transparently" (without demodulation/decoding) in the switch 28 so that they reach the respective appropriate output ports.

A clock generator 31 generates the TMC centering data which is multiplexed by the data multiplexer 32 with the other data from the unit 30. Thus the switching planes of the switch 28 and the downlink ports 33 are clocked by a common clock.

The controller, and more particularly the unit 30, operate in the following manner on each group of payload data to which the BHP points:
- if an output channel is available in the output port targeted by the BHP, the block 30 configures the operation of the switch so as to switch the data group in question to the indicated output, or
- if an output channel is not immediately available in the output port, the controller can delay the data group with onboard delay means until a data channel becomes available.

Thus conflict situations at the output ports are managed by the unit 30. The methods of resolving such conflicts are therefore as follows:
- temporal reassignment of payload data packets: some payload data packets in conflict with others are delayed, as mentioned above and described in more detail below, by time delay means (for example buffer memory, delay line),
- frequency reassignment of the payload data packets: each port consisting of a group of frequency channels, if payload data packets arrive at the same output port and on the same data frequency channel, under the control of the unit 30, the switch 28 performs a frequency conversion in order to present at the same time the payload data packets previously in conflict on different data channels of the same output port,
- port reassignment: if the quality of service associated with the data packets allows it, the switching unit 30 can elect to modify the output port for data packets in conflict, in order to reduce the instantaneous load on the output port suffering congestion; the redirection output port is chosen according to the following criteria:

a) its availability, and b) the stations 7 covered by the beam associated with the redirection port are capable of detecting the redirected payload packets and forwarding them to the satellite on data channels with priority data in the associated switching requests preventing infinite looping.

FIG. 5 shows in detail the switch 28 and its interconnections with the controller 29. The stream of data from the n sending stations representing the various ports {port1; port2; . . . portn} is symbolized by an arrow 35. This multiplex stream is demultiplexed and then transposed to lower frequencies compatible with subsequent equipment units in the processing system. N groups of channels each comprising p+1 channels (there is not necessarily the same number of channels in each group) then reach respective channel switching units 36. In fact, each unit 36 is made up of p+1 switching submatrices each dedicated to an input channel and an output channel of the corresponding unit 36. Each channel switching unit has p inputs for receiving the associated group of channels and p outputs. The control channel (CC) of the group is isolated and directed to an input of a multicarrier demultiplexer demodulator decoder (MCDDD) unit 37. The unit 37 receiving the n control channels of the n groups of channels, its function is demultiplexing, demodulating (by means of a demodulator unit 371) and decoding (by means of a decoder unit 372) these channels. This unit also has the function of establishing an estimate for centering control data intervals relative to the master clock of the controller. Once the control data has been recovered as raw data, the data is analyzed by the controller 29, and especially by the scheduler 30, as explained with reference to FIG. 4. Analysis of the various control data switching requests produces instructions to the controller, firstly Scom1 to the p submatrices of the n channel switching units 36 and secondly Scom2 to the p switching submatrices of ports of an n×n port switching matrix 38. The matrix orients the various payload data channels to the appropriate ports or spots as a function of their destination and the availability of ports.

The controller also supplies the centering (TMC) signals in a modulator/coder unit 39. The n outputs of the unit 39 supply the centering data for the n TMC included in the n groups of channels at the output of the matrix 38. Of course, the centering data is supplied in the form of telemetry packets (TMP) clocked by the master clock 31. The n groups at the output of the matrix 38 are then subjected to a first operation of multiplexing and transposition to higher frequencies by a multiplexer/converter unit 40. The signals leaving each of the n units 40 are then multiplexed and transposed to higher frequencies appropriate to radio transmission by a unit 41.

The time delays referred to above for analyzing switching requests can be provided either at the level of each submatrix of the channel switching units 36 or at the level of the submatrices of the port switching matrix 38.

It should be emphasized that the controller can also include means controlled and activated by the controller for destroying any "unswitchable" payload data packet at the input of the switch.

One embodiment of the burst encapsulation protocol is as follows:

Data arriving from outside the satellite system is transported in network packets (typically IP packets). The size of these packets varies, and is often not controlled. A first step therefore consists of constructing bursts of data by aggregating these network packets. The aggregation criteria include the same destination, the same QoS, etc. The size of the bursts can be fixed or variable, and the time to construct the burst can also be a determination criterion. For example, in the case of a Voice over IP (VOIP) QoS, the time delay authorized for the network packets is very short. For this reason, when constructing data bursts, the time of arrival of the network packets determines the time of closure of the bursts and therefore their size. The minimum size of the bursts is fixed by the transport capacity of the transport packets (see below) and the maximum size is often determined by the maximum size of a network packet. The assembly of network packets into bursts is described in a burst preamble, indicating the number and size of the network packets assembled in the burst, this preamble therefore enabling the network packets to be reconstituted in the unit 25. These mechanisms operate at the level of the burst layer.

For reasons connected with synchronization and simplification of the satellite system, a burst segmentation step can be introduced. The bursts are divided into packets of fixed size that constitute the "segments". A segment preamble is attached to the segment, including an indicator identifying the burst in the system to which the segment is attached, as well as the rank of the segment in the burst. The combination of the segment and the segment preamble is then processed (coded) for protection against transmission errors. Once coded, the segment and preamble combination can have added to it "single word" data that is sometimes required by the demodulator algorithms implemented in the satellite receiver unit 23. From the physical layer point of view, the payload data packets that are switched by the switch 28 correspond to these fixed size coded packets accompanied by their single word.

In the context of the present invention, the control data (switching requests) has been described as being included in a frequency channel different from that or those containing the associated payload data. In a preferred embodiment, the control data frequency channel is transmitted in advance of the payload data, which economizes on memory space on board the satellite. It is clear that the essence of the invention consists in the possibility of dissociating the control data from the payload data so that it can be processed differently. Consequently, the invention also covers the case, not described, of control and payload data transmitted in TDMA or even CDMA mode, the control data being transmitted in advance of the associated payload data on the same frequency channel or a different frequency channel.

The invention claimed is:

1. A data switching system for a satellite in a satellite data transmission system relaying from a terrestrial sending area to a terrestrial receiving area via said satellite, data including payload data and associated control data, which comprises respective switching requests and provides data on the switching of said payload data, said data switching system comprising:

a plurality of first inputs for receiving payload data channels carrying said payload data, a plurality of second inputs for receiving control data channels carrying said associated control data including said switching requests and said data on the switching of said payload data, means connected to said second inputs for analyzing control data based on a signal conveying said control data; and switching means connected to said first inputs and comprising a plurality of outputs connected to a plurality of sending ports for sending said data to said receiving area, said switching means for switching said payload data as a function of a result of said analysis of said associated control data to at least one of said plurality of sending ports for sending said data to said receiving area, wherein said analyzer means analyzes only said control data, and said payload data is not analyzed, wherein said payload data is not demodulated/decoded or de-assembled onboard said satellite, and further wherein said means for analyzing comprises a plurality of outputs for supplying centering data at the plurality of outputs of the switching means.

2. The switching system claimed in claim 1 wherein said analyzer means comprises extractor means for extracting necessary data for analyzing said control data carried by said signal, followed by a control means that configures said switching means as a function of the extracted data.

3. The switching system claimed in claim 2 wherein said extractor means include means for demodulating and decoding said control data.

4. The switching system claimed in claim 2 wherein the signal conveying said control data is an frequency division multiple access (FDMA) frequency division multiplex signal, first frequency channels are assigned to said payload data, second frequency channels are assigned to said control data, and said extractor means include a frequency division demultiplexer means, followed by a filter means that supplies the data content of said second frequency channels to said control means.

5. The switching system claimed in claim 2 wherein the signal conveying said control data is a time division multiple access (TDMA) time division multiplex signal, first groups of time windows are reserved for said payload data, second groups of time windows are dedicated to said control data, and said extractor means include a time division demultiplexer means that supplies the data content of said second groups to said control means.

6. The switching system claimed in claim 1 including means for generating and transmitting a reference clock that times the sending of control data packets on board said satellite, and said payload packets and said control data packets from the ground, wherein said reference clock signal is transmitted from said satellite to said satellite adaptor so as to control synchronization.

7. The switching system claimed in claim 1 further comprising estimator means for estimating the quality of synchronization, referred to as control data packet centering, for subsequent transmission of centering data to a ground station for centering said payload data and said control data to be sent by said station, characteristics of said control data demodulation and decoding on board said satellite, the downlink loads, or the status of the equipment on board the satellite.

8. The switching system claimed in claim 1 including delay means for delaying any payload data packet in transit in the switching means of said satellite with time delays that are controlled and activated by said analyzer means.

9. A data transmission device for ground stations of a satellite data transmission system that relays from sending ground stations to receiving ground stations via said satellite, data including payload data and associated control data including respective switching requests, and that provides data on said payload data,
    said device including adapter means for transporting said data addressed to said satellite,
    wherein said control data including respective switching requests is analyzed separately from said payload data on said satellite, and
    wherein a data packet of said payload data is generated by a data packet generator and a header packet of said control data is generated by a control packet generator, and
    an output of said control packet generator is not provided to said data packet generator, and further wherein said payload data is not demodulated/decoded or de-assembled onboard said satellite, and further wherein based on said analyzed data, a plurality of outputs is provided for supplying centering data at a plurality of outputs for switching.

10. The transmission device claimed in claim 9 including means for generating payload data bursts, means for generating control data constituting switching requests each pointing to associated payload data, and means for one of frequency and time division multiplexing said data to assign first channels to said payload data and second channels to said control data, wherein the control data are transmitted on a channel of a control channel group and payload data are transmitted, after a predetermined time interval allowing resolution of the switching request, on a channel of a data channel group; and
    wherein the control and data channels are connected to said adapter means for packet synchronisation before transmission to the satellite.

11. The transmission device claimed in claim 9 wherein first and second frequency channels are respectively combined in a first group and a second group, respectively.

12. A method of transmitting data in a satellite data transmission system, comprising
    relaying from a terrestrial sending area to a terrestrial receiving area via said satellite, data including payload data and control data constituting respective switching requests and
    providing on board the satellite data on the switching of said payload data to be carried out on board said satellite,
    transmitting from the ground station to the satellite payload data on first channels, and control data on second channels,
    providing a plurality of first inputs for receiving payload data channels and a plurality of second inputs for receiving control data channels,
    analyzing on board the satellite said control data from said second inputs based on a signal conveying said control data, switching said payload data from said first inputs as a function of a result of said analysis of said associated control data to at least one of a plurality of sending ports for sending said data to said receiving area, and
    further wherein only said control data is analyzed, and said payload data is not analyzed, and said payload data is not demodulated/decoded or de-assembled onboard said satellite, and further wherein said analyzing comprises a supplying centering data at a plurality for said switching.

13. The transmission method claimed in claim 12 wherein said control data is sent in advance of the associated payload data during an advance time, wherein said advance time is reduced by a maximum time for analyzing and calculating on board said satellite a switching configuration resulting from said switching requests.

14. The transmission method claimed in claim 12 wherein said payload data and said control data are transmitted simultaneously.

15. The transmission method claimed in claim 12 wherein said payload data is sent as packets separated by periods of silence comprising guard times characteristic of the capacity of said satellite to switch from one switching configuration to another.

16. The transmission method claimed in claim 12 wherein data incoming from or outgoing to an exterior of said satellite system undergoes conversion of transport format to ensure compatibility with a data transport format specific to said satellite system.

17. The transmission method claimed in claim 12 wherein the switching requests generated assure propagation of quality of service through the satellite system if said quality of service exists outside said satellite system.

18. The transmission method claimed in claim 12 wherein the switching requests generated assure correct switching of said payload data so that, from external to said satellite system, said payload data is switched to destinations defined by address data in said routing request and associated with said payload data before entering said satellite system, thereby establishing a correspondence between output ports of said satellite and address data associated with said payload data before entering said satellite system.

19. The transmission method claimed in claim 12 wherein the sending of said payload data and said control data is clocked by signals from a reference clock on board said satellite and carried by a downlink control channel to said satellite adaptor so as to control synchronization.

20. The transmission method claimed in claim 12, wherein characteristics of the payload data stream in terms of payload bit rate are controlled using an uplink and downlink resource management indicator carried on a downlink control channel.

21. The transmission method claimed in claim 12, wherein sending characteristics of the modulated signal in terms of bit timing, phase, and power are controlled using a demodulation and decoding indicator conveyed by a downlink control channel.

22. The transmission method claimed in claim 12 wherein the centering of payload data packets is controlled by separating said payload data packets by a common guard time, said guard time being presented to said satellite at the same time to change the switching configuration without interruption of service, and further wherein synchronization is achieved by use of centering data from a downlink control channel.

23. A method of switching data for a satellite in a satellite data transmission system, comprising
relaying from a terrestrial sending area to a terrestrial receiving area via said satellite, data including payload data and associated control data constituting respective switching requests and that provides the data on the switching to be applied to said payload data,
providing a plurality of first inputs for receiving payload data channels and a plurality of second inputs for receiving control data channels,
analyzing only said control data from said second inputs based on a signal conveying said control data, and not analyzing said payload data, and
switching said payload data of said first inputs to different sending ports to said receiving area as a function of the analyzed switching requests, and wherein said a load data is not demodulated/decoded or de-assembled onboard said satellite, and further wherein said analyzing comprises providing a plurality of outputs for supplying centering data for the switching.

24. The switching method claimed in claim 23 wherein conflict situations at the same output port are resolved using time reassignment, frequency reassignment or port reassignment.

25. The switching method claimed in claim 23 wherein, for reassignment, a routing request associated with a redirected payload data packet contains a high priority recommendation.

* * * * *